ically moist to stick together and yet

UNITED STATES PATENT OFFICE.

WILLIAM L. DUDLEY, OF NASHVILLE, TENNESSEE.

SNUFF TABLET.

SPECIFICATION forming part of Letters Patent No. 639,365, dated December 19, 1899.

Original application filed April 26, 1899, Serial No. 714,568. Divided and this application filed September 13, 1899. Serial No. 730,380. (No specimens.)

*To all whom it may concern:*

Be it known that I, WILLIAM LOFLAND DUDLEY, a citizen of the United States, residing at Nashville, in the county of Davidson and State of Tennessee, have invented certain new and useful Improvements in Snuff Tablets; and I do hereby declare the following to be a full, clear, and exact description of the invention, such as will enable others skilled in the art to which it relates to make and use the same.

My invention contemplates the manufacture of snuff in tablet or lozenge form, thus presenting to the dealer, and particularly to the consumer, a more convenient and satisfactory article than anything of similar nature heretofore produced or known to the trade. A snuff tablet of this character has long been a desideratum of snuff and tobacco manufacturers, dealers and consumers, chiefly because of the great convenience thereby afforded the latter class in partaking of the article, the readiness with which the quantity used may be apportioned, and the avoidance of waste.

Heretofore in all attempts to produce a snuff tablet foreign and binding matter have been employed, the presence of which invariably impaired the flavor and odor of the snuff and rendered the tablet hard and not readily comminuted for subsequent use.

When produced in accordance with my invention, the snuff tablet or lozenge will have an outer or protective skin or shell of considerable density, whereby its form or shape is preserved and an interior or body of granular character, so that when the tablet is crushed for use the resultant mass will be in a granular rather than a powdered condition, and there will be an absence of any foreign matter which would affect the natural flavor or odor of the snuff, and such a snuff-tablet embodies my present invention.

In carrying out my invention I take the ordinary powdered snuff as found in the market and thoroughly mix the same with a small percentage (preferably about two-fifths of its weight) of a neutral fluid, such as pure water or alcohol, until its molecules are sufficiently moist to stick together and yet sufficiently dry to permit rubbing the same through a fine sieve, (about No. 16, for example,) the purpose of this step being to granulate the snuff. When thus granulated, the mass in its granular form is subjected to a moderate heat—a temperature approximating 140° Fahrenheit has been found effective for the purpose—until such time as the added water or other neutral fluid has been driven off or evaporated and the granulated snuff reduced to its original condition, after which the granulated snuff is by any approved means compressed into tablets of predetermined dimensions and weight.

The proportions and temperatures hereinbefore noted have been found to produce results which are highly satisfactory and are therefore given for the purposes of this specification, though the same may be varied within limits without departing from the spirit of my invention, the important points to be noted being, first, that the snuff is duly moistened by the use of so much of a neutral fluid as will reduce it to a molecular condition which can be readily granulated; secondly, that it be rubbed through a sieve of suitable gage for the purpose of thorough granulation in order to insure cohesion when finally pressed into tablets, and, thirdly, that the snuff thus granulated must be restored to approximately its original degree of moisture by subjecting the same to a suitable degree of heat which evaporates the moistening fluid originally added, leaving the mass in dry but granular form. It is important that the heat applied to drive off the added neutral fluid should not be sufficiently high to overheat the snuff, as in such case the product will be harsh, powdery, and objectionable to the user.

The particular method above set forth for the manufacture of snuff tablets forms the subject-matter of my application, Serial No. 714,568, filed April 26, 1899, pending simultaneously herewith, the present case being a divisional application thereof.

Having thus described my invention, what I claim, and desire to secure by Letters Patent, is—

A compressed snuff tablet devoid of binding material and foreign matter, said snuff tablet having an outer skin or shell and an interior or body of granular snuff, substantially as and for the purposes specified.

In testimony whereof I affix my signature, in presence of two witnesses, this 5th day of September, 1899.

WILLIAM L. DUDLEY.

Witnesses:
A. B. HILL,
D. P. WRENNE.